United States Patent [19]

Parrott

[11] Patent Number: 4,763,961
[45] Date of Patent: Aug. 16, 1988

[54] DEBRIS REMOVAL APPARATUS FOR TRACK TYPE VEHICLES

[76] Inventor: John R. Parrott, Rte. 3, Sumner, Ill. 62466

[21] Appl. No.: 862,709

[22] Filed: May 13, 1986

[51] Int. Cl.$^4$ .............................................. B62D 55/00
[52] U.S. Cl. ...................................... 305/12; 180/9.1; 198/494; 305/60
[58] Field of Search ............... 180/9, 9.1; 280/158 R, 280/158 A; 305/11, 12, 13, 60; 301/51; 198/494

[56] References Cited

U.S. PATENT DOCUMENTS 4,235,479 11/1980 Puglise .................................. 305/12

Primary Examiner—John J. Love
Assistant Examiner—Mitchell J. Hill
Attorney, Agent, or Firm—Hill, Van Santen, Steadman & Simpson

[57] ABSTRACT

A track type vehicle is provided with debris removal apparatus to prevent packing in a cavity defined by the track, the vehicle body, the drive sprocket, the idler and the frame member which mounts the drive sprocket and the idler. The debris removal apparatus is constructed in the form of a shaped plate whose peripheral edge conforms to the shape of the cavity and the plate is dimensioned such that the peripheral edge lies in immediate proximity of the cavity defining elements. In a normal or reset position, the plate lies immediately adjacent the body of the vehicle and in the operated condition, is moved outwardly by a plurality of hydraulic rams to push debris out of the cavity and prevent accumulation and packing. The plate may be further shaped, as viewed from the top, to include pockets for receiving roller supports which carry rollers for supporting the upper section of the track. Advantageously, the roller supports may include holes therethrough for receiving the piston rods of the hydraulic rams.

11 Claims, 3 Drawing Sheets

DEBRIS REMOVAL APPARATUS FOR TRACK TYPE VEHICLES

BACKGROUND OF THE INVENTION

1. Field of the Invention

The present invention relates to track type vehicles, and more specifically to apparatus for removing and clearing debris which accumulates between the frame and the track of such a vehicle during operation, particularly during and after inclement conditions.

2. Description of the Prior Art

Track type vehicles are well known in the art and include all types of machines such as track type tractors and loaders, tanks, half tracks, swamp crawlers, track type trenchers, track hoes excavators and other types of construction and military equipment.

Vehicles of the type set forth above generally include, on each side, a cavity defined by a frame member, a drive sprocket and a idler mounted on the frame member, the vehicle body and the upper portion of the track above the frame member. During operation of such vehicles in mud and the like, all types of debris including mud, stones, sticks, etc drop from the upper portion of the track into the aforementioned cavity and tend to pack. It is then necessary for the operator to stop the machine and manually clean out the cavity in that packing decreases the mechanical life of the undercarriage by increasing wear. Also, machine horsepower is reduced due to packing. Keeping the tracks free of mud makes the machine lighter and, therefore, the ground pressure is less. Therefore, cleaning and removal of debris helps the machine maintain its maximum horsepower and limit maintenance costs.

In winter, the situation becomes worst in that the debris must be removed in that mud will freeze in the tracks and the machine cannot be moved. It usually requires one to two manhours to dig a machine out, of course depending on the size of the machine. This is an additional expense.

SUMMARY OF THE INVENTION

The object of the present invention is to provide apparatus for removing debris which accumulates in the side cavities of track type machines.

The above object is achieved, according to the present invention, by providing, on each side of a track type machine, a shaped plate structure which is mounted in the cavity. The plate is mounted on hydraulic rams connected between the vehicle and the plate for movement from a reset position adjacent the vehicle body to a position away from the body so as to push debris from the cavity. Such a structure provides a plurality of advantages. First of all, an operator may stop operation of his machine at any time and remove the bulk of the debris on each side of the machine by simply operating a lever and take advantage of the mechanical advantage offered by the hydraulic system. Secondly, manual cleaning is advantageously minimized and the total downtime for cleaning is reduced from hours to minutes. Secondly, with such short downtimes, a machine may be cleared of debris as often as desired so that there is also a decrease in maintenance due to wear and a decrease in fuel consumption due to weight, while at the same time maintaining machine horsepower.

BRIEF DESCRIPTION OF THE DRAWINGS

Other objects, features and advantages of the invention, its organization, construction and operation will be best understood from the following detailed description, taken in conjunction with the accompanying drawing, on which:

FIG. 6 is a schematic illustration of a hydraulic circuit for controlling the hydraulic rams on one side of a vehicle, as may be employed in practicing the present invention.

DESCRIPTION OF THE PREFERRED EMBODIMENTS

Figure 1:
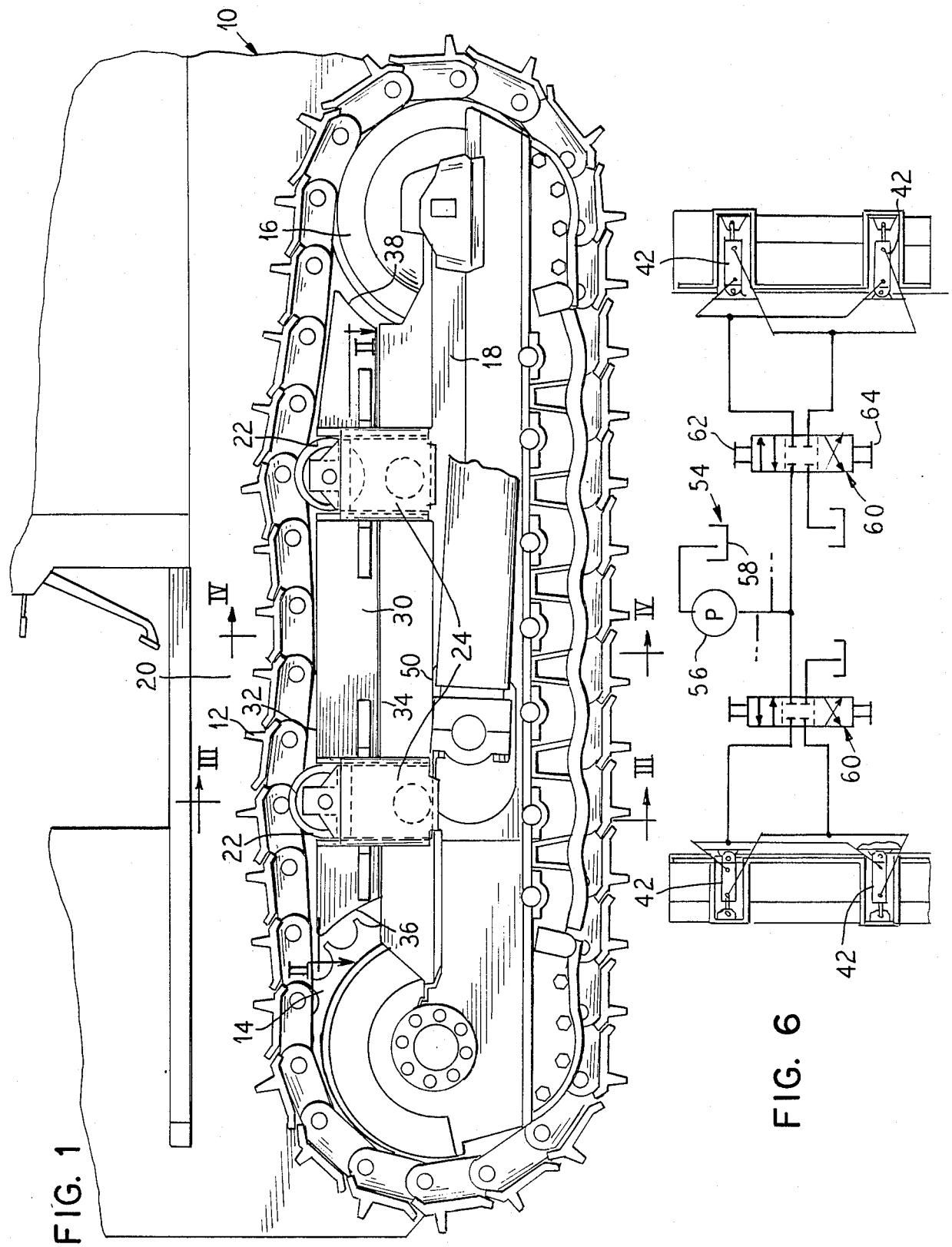
FIG. 1 is a side elevation of a track system of a track type vehicle, showing the debris removal apparatus of the present invention.
Figure 2:
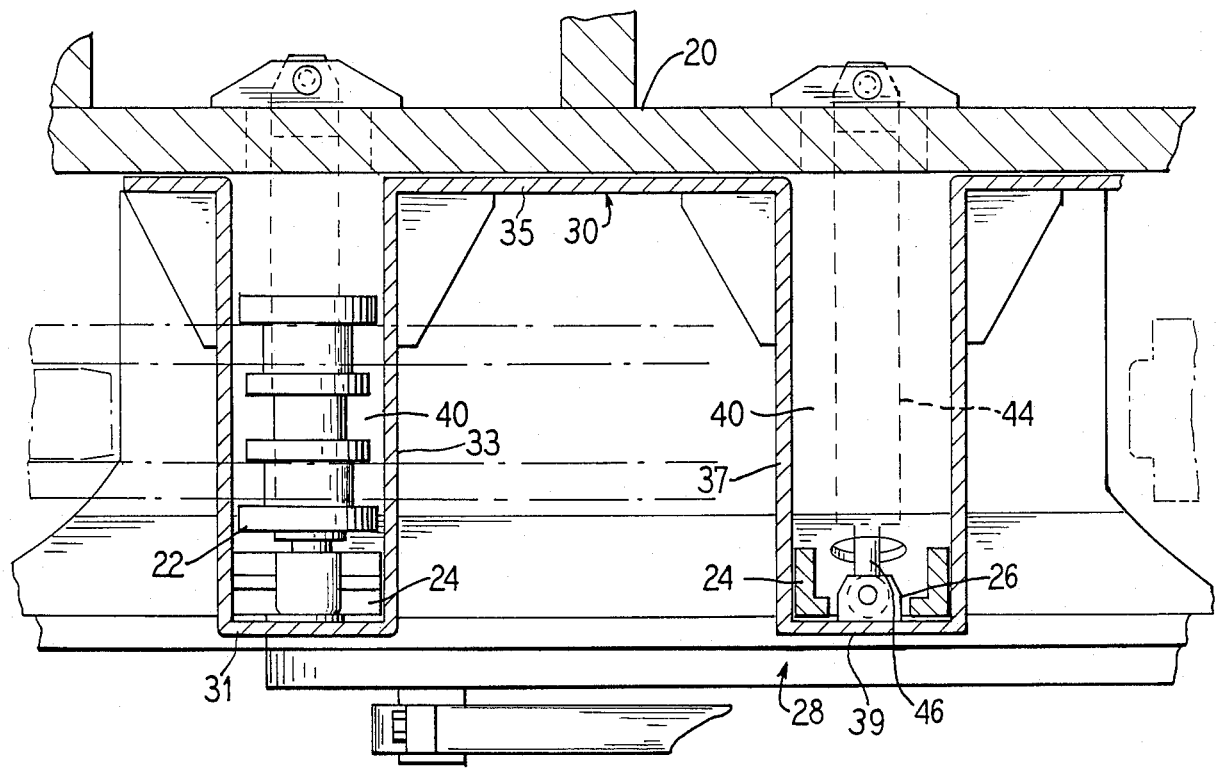
FIG. 2 is a longitudinal section taken along the line II—II of FIG. 1.

Referring to FIGS. 1, 2, 3 and 4, a track system is generally shown at 10 as comprising a track 12 which is drivingly entrained about a drive sprocket 14 and about an idler 16, the drive sprocket and idler being mounted on a frame member 18 of the vehicle which is represented by a fragmentary showing of the vehicle body 20.

At the upper side, the track 12 is supported in the region between the drive sprocket 14 and the idler 16 by a plurality of rollers 22 carried by a like plurality of roller supports 24 mounted on the frame member 18. Each of the roller supports 24, in this particular embodiment, comprises a hole 26 extending therethrough, the purpose of the hole becoming abundantly clear hereinbelow.

The track system is equipped with debris removal apparatus 28 according to the invention. As shown, the debris removal apparatus 28 is illustrated as comprising a plate 30 including an upper edge 32, a lower edge 34, a shaped edge 36 to accommodate the arc of the drive sprocket 14 and a shaped edge 38 to accommodate the arc of the idler 16. The plate 30 may be constructed as a weldment or the like and may also include reinforcements (not shown) for rigidity, depending on the particular application. The plate 30 is also shown as being serpentine and comprising a plurality of walls 31, 33, 35, 37 and 39 which define a plurality of pockets 40 for receiving the roller supports 24.

Figure 5:
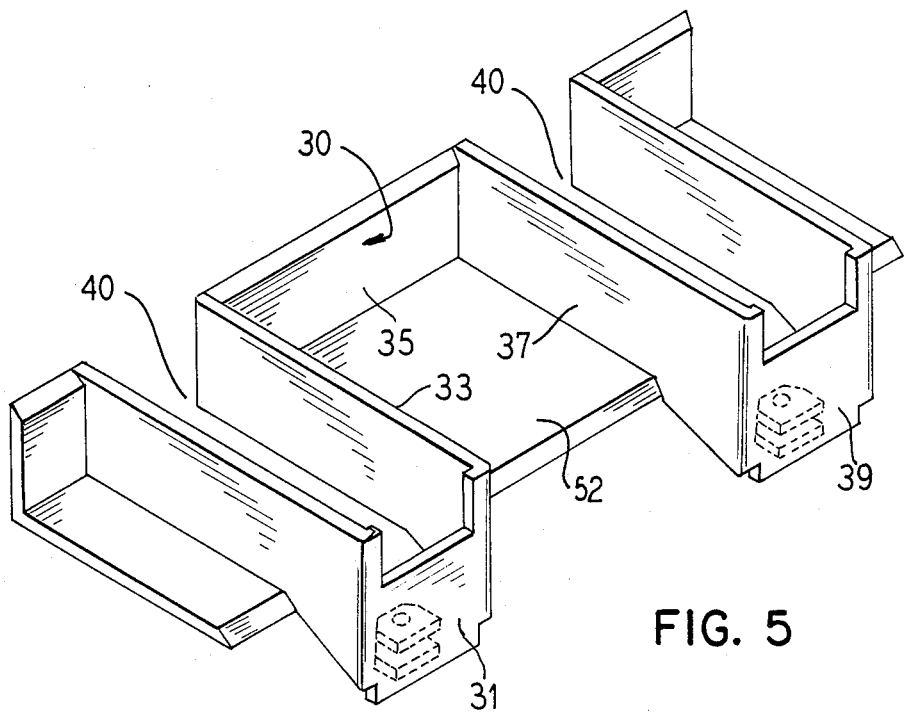
FIG. 5 is a fragmentary perspective view, similar to that of FIG. 3, showing an alternate construction at the lower end of the debris removal plate.
Figure 3:
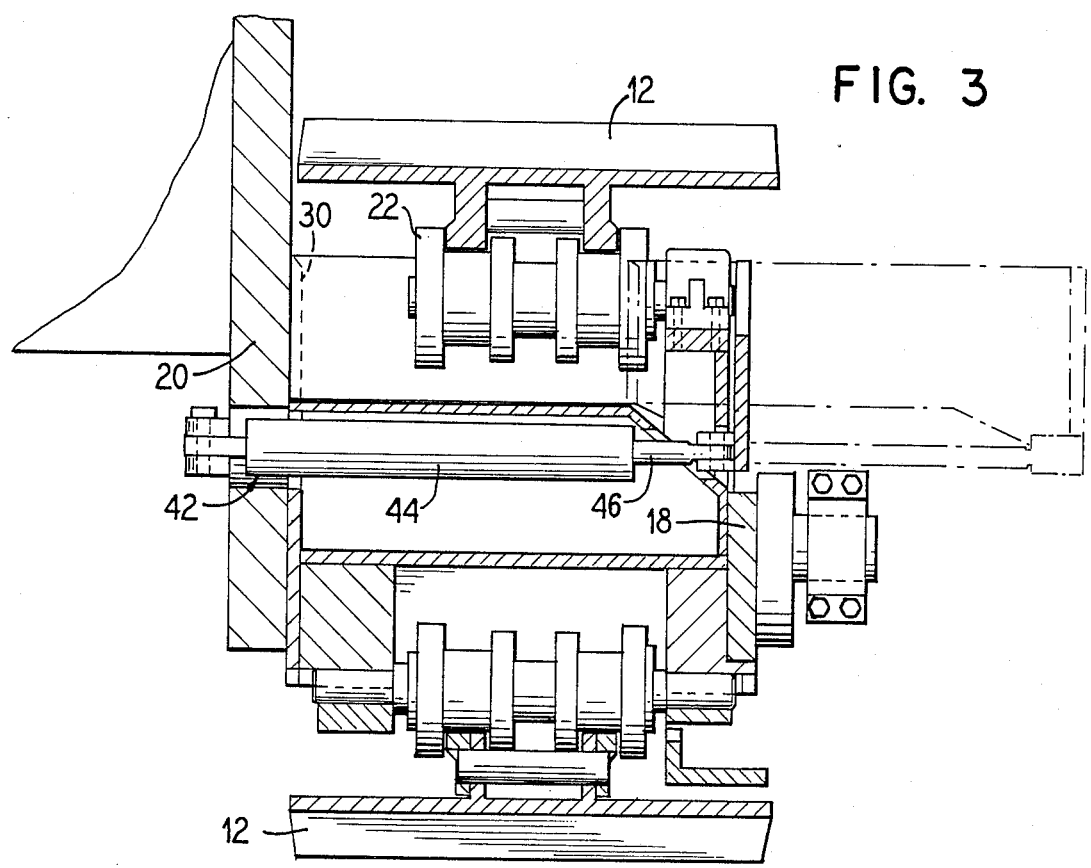
FIG. 3 is a vertical section taken along the line III—III of FIG. 1, in particular showing the debris removal plate structure.
Figure 4:
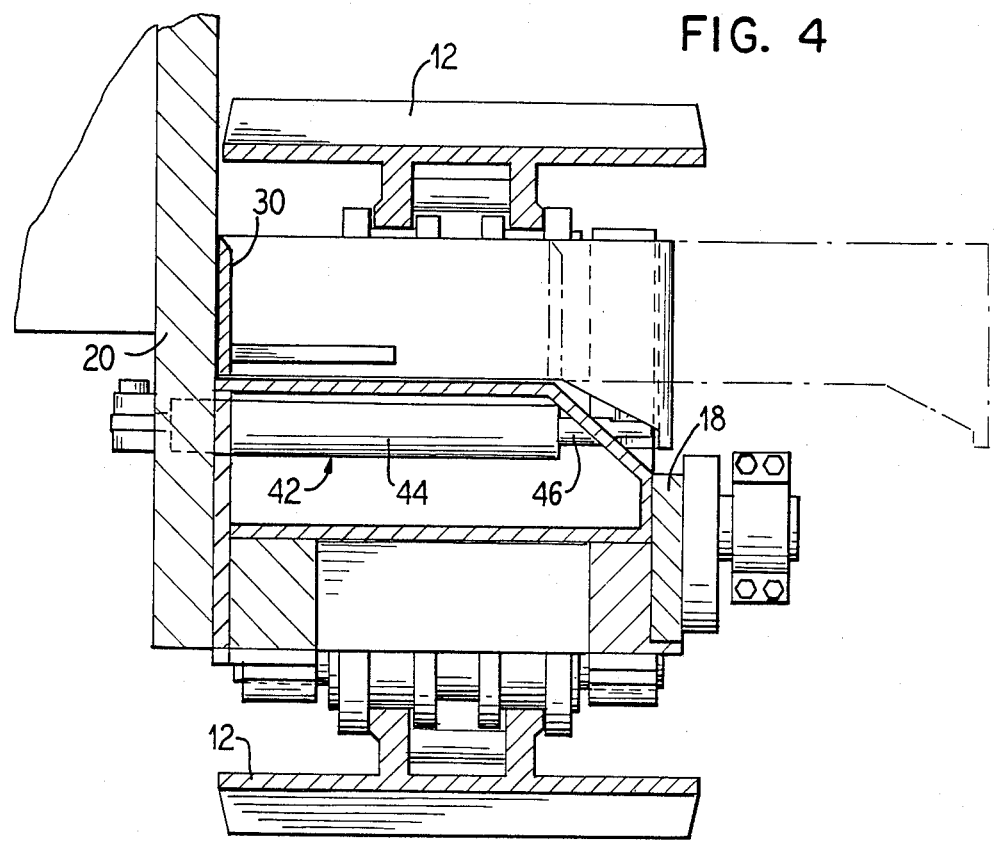
FIG. 4 is a vertical section taken substantially along the line IV—IV of FIG. 1 showing the relationships between the vehicle body, a hydraulic ram and the debris removal plate.

A plurality of hydraulic rams 42 are provided, each including a hydraulic cylinder 44 and a piston rod 46. As shown, the hydraulic cylinder 44 is mounted to the vehicle body 20 and the piston rod 46 is mounted to the plate 30. In order to compensate for uneven piston movement among the rams, it is preferred that the connection of the piston rod to the plate be made with the connecting pin vertically oriented. As illustrated particularly in FIG. 4, each piston rod 46 is received through a respective hole 26 of a roller support 24. In the alternative, the rams could be mounted slightly offset so that the piston rod extends along one side or the other of the respective roller support, in which case it will be necessary to provide slightly wider pockets (FIG. 5).

In what is a normal, rest or reset position, the plate 30 is mounted in the cavity defined by the frame member (and its fender), the drive sprocket, the idler and the upper portion of the track. In its operated condition, however, the hydraulic rams 42 are operated to extend the piston rod 46 and move the plate 30 away from the vehicle body to a position beyond the frame member and, preferably, beyond the edge of the track. The distance of movement, of course, is governed by the available stroke which, in turn, is governed by the available space for mounting the rams.

On vehicles in which the rollers 22 extend beyond the widths (in the track laying direction) of the roller supports 24, it may be necessary to further shape the upper edge of the plate 30, and cut out the upper edges of the pockets 40. Depending on the machine and the course of the track, one may also wish to further shape the upper edge 32 to accommodate track sag and/or track elevation between the rollers and the adjacent drive sprocket or idler.

On machines such as bulldozers in which the frame member 18 also carries the mount for the blade, it may be further necessary to shape the lower edge 34 for clearance, as indicated by the line 50. In all instances, however, the plate is sized and has its peripheral edge shaped to lie in close proximity to the sprocket, idler, frame member (or its fender if provided) track and support rollers so as to minimize any collection of debris behind the plate.

Referring to FIG. 5, an alternate plate construction is illustrated which accommodates the slope of a shaped frame member 18 (or its fender). In this alternative, the plate 30 is shown as having a plate extension 52 which is directed parallel to the frame member (or its fender) and lies immediately adjacent thereto when the plate is in the reset position. Of course, with the type of equipment set forth above with respect to bulldozer blades, the plate extension 52 may also require shaping to clear the blade mount.

Turning now to FIG. 6, one possible hydraulic circuit is illustrated for operating the hydraulic rams on each side of the vehicle. As shown, the system comprises a hydraulic source 54 including a pump 56 and a hydraulic reservoir or tank 58. The hydraulic source 54 is ordinarily a part of such a vehicle and therefore is not a source of additional expense. Connecting the hydraulic source 54 to the plurality of rams 42 is a valve 60, here being indicated as a hand operated valve 62 which is spring loaded as indicated at 64 and which may comprise the illustrated port structure. When the valve 60 is operated such that the upper section is considered to be moved in the central section, pressure is provided to the rear ports of the rams 42 to move the piston and piston rod out, while the front ports are connected directly back through the valve to the tank 58. The plate 30 is therefore moved out from its reset position to push debris out of the cavity. Any debris adhering to the plate may then be easily scraped off with a shovel or the like. Operation of the valve to the opposite position in which the lower port structure is considered to move into the central section causes the front ports of the rams 42 to be connected to the pump 56 and the rear ports to be connected to the tank 58. The pistons and piston rods therefore move toward the rear and pull the plate 30 back into its reset position.

Other value structures could, of course, be used, including those with solenoid actuation, pilot assist and the like.

It goes without saying that the plate 30 may be subdivided and provided as a plurality of plates, each with its own actuating ram or rams, depending on the particular machine application. If such plates are constructed to slightly overlie one another, it would be necessary to operate all rams simultaneously. If, however, the plate sections are constructed so as to essentially abut at their adjacent edges, individual sections of the cavity could be cleared independently of the other sections.

Some newer type machines include an idler at each end and a drive sprocket centrally located in the place of support rollers; these machines can also benefit from the present invention by the provision of a hydraulically-operated pusher plate having rams located fore and aft of the drive sprocket, as also covered by the appended claims.

Many other changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. A debris remover for a track type vehicle of the type which has a body and is adapted to move over the ground supported on an endless track which is entrained about the track drive sprocket and at least one idler which are mounted on a frame member, in which the track is supported between the track drive sprocket and the at least one idler by a roller carried by a roller support connected to the body, and in which the track, the sprocket, the body and the at least one idler and the frame member define a cavity above the frame member which is susceptible to collect debris therein, the debris remover comprising:

plate means in and conforming to the shape of the cavity; and mounting means mounting said plate means in said cavity at a first position immediately adjacent the body, said mounting means including actuation means operated to move said plate means away from the body to a second location to push collected debris out of the cavity, said roller support mounted on the body frame member and dividing the cavity into sections, and said plate means comprising pocket means for receiving the roller support when said plate means is adjacent the vehicle body, said plate means comprising a section extending downwardly and then outwardly over the frame member when said plate means is in the first position.

2. The debris remover of claim 1, wherein a plurality of roller and a roller supports are provided spaced apart and divide the cavity into a plurality of sections, and wherein:

said plate means comprises pocket means defining a plurality of pockets therein for receiving respective ones of the roller supports when said plate means is adjacent the vehicle body.

3. The debris remover of claim 1, wherein: said plate means comprises sheet metal.

4. The debris remover of claim 1, wherein the track is susceptible to sagging and wherein:

said plate means including an upper edge having a profile accommodating the sag of the track and the shape of the roller.

5. The debris remover of claim 1, wherein said actuation means comprises:
   at least one hydraulic ram including a hydraulic cylinder mounted to the vehicle and an extensible/retractable piston carrying a piston rod, said piston rod connected to said plate means; and
   valve means for connection to a vehicle hydraulic supply and connected to said cylinder and selectively operable to cause extension and retraction of said piston rod.

6. The debris remover of claim 1, wherein said actuation means comprises:
   a plurality of spaced apart hydraulic rams each including a hydraulic cylinder mounted to the vehicle and an extensible/retractable piston carrying a piston rod connected to said plate means; and
   control means for connection to a vehicle hydraulic source, said control means connected to each of said hydraulic cylinders and selectively operable to cause extension and retraction of all of said piston rods simultaneously.

7. The debris remover of claim 1, wherein:
   the roller support comprises a hole therethrough; and
   said actuation means comprises a hydraulic cylinder mounted to the vehicle and an extensible/retractable piston rod extending from said hydraulic cylinder through said hole and connected to said plate means.

8. The debris remover of claim 1, wherein:
   a plurality of track support rollers and respective roller supports are mounted spaced apart to the body and each of said roller supports comprises a hole therethrough; and
   said actuation means comprises a plurality of hydraulic cylinders mounted to the body and each including an extensible/retractable piston rod extending through a respective hole and connected to said plate means.

9. The debris remover of claim 1, wherein:
   said actuation means comprises a hydraulic cylinder mounted to the body and an extensible/retractable piston rod extending from said cylinder along side the roller support and connected to said plate means.

10. The debris remover of claim 1, wherein a plurality of the roller support and a plurality of the support rollers are mounted spaced apart in the cavity, and wherein:
    said actuation means comprises a plurality of spaced apart actuators connected between the body and said plate means and each including a reciprocal member extending adjacent a roller support.

11. A debris remover for a track type vehicle of the type which has a body and is adapted to move over the ground and supported on an endless track which is entrained about a track drive sprocket and at least one idler which are mounted on a frame member, in which the track is supported between the track drive sprocket and the at least one idler by a roller carried by a roller support connected to the body, and in which the track, the sprocket, the body and the at least one idler and the frame member define a cavity above the frame member which is susceptible to collect debris therein, the debris remover comprising:
    plate means in and conforming to the shape of the cavity; and
    mounting means mounting said plate means in said cavity at a first position immediately adjacent the body, said mounting means including actuation means operated to move said plate means away from the body to a second location to push collected debris out of the cavity;
    said roller support mounted on the body frame member and dividing the cavity into sections, said plate means comprising pocket means including a vertical serpentine wall forming a pocket for receiving the roller support when said plate means is adjacent the vehicle body.

* * * * *